Nov. 27, 1962 — G. S. PAPAZIAN — 3,065,884
METERING AND DISPENSING VALVE ATTACHMENT
Filed April 8, 1960

INVENTOR.
Garabed S. Papazian
BY
March, Gillette, Virgil & Eslinger
ATTORNEYS

United States Patent Office 3,065,884
Patented Nov. 27, 1962

3,065,884
METERING AND DISPENSING VALVE
ATTACHMENT
Garabed S. Papazian, 602 Bard Ave., Staten Island, N.Y.
Filed Apr. 8, 1960, Ser. No. 20,888
1 Claim. (Cl. 222—332)

This invention relates to liquid dispensing and metering devices, and more particularly to small metering dispensers of the type adapted to be applied to liquid containing vessels such as bottles, jars and the like, to dispense measured quantities of a contained liquid.

An object of the invention is to provide a novel and improved small metering and dispensing attachment which may be used with containers such as jars, bottles and the like so as to provide a convenient means of dispensing measured amounts of the liquid contained therein.

Another object of the invention is to provide an improved metering type dispensing attachment as above set forth, which is extremely easy to operate, and is foolproof in its operation.

A further object of the invention is to provide an improved dispensing attachment as above set forth, which provides for accurate metering or measuring of the liquid volumes which are to be used, said device being reliable in its operation at all times.

Yet another object of the invention is to provide an improved liquid metering and dispensing device which is characterized by a free flow of the measured liquid substance from the device.

A feature of the invention resides in the provision of an improved liquid dispensing device which is easy to take apart and clean, and which is inherently sanitary in its construction by being devoid to a great degree of dirt-collecting cracks, grooves and the like.

A still further object of the invention is to provide an improved metering and dispensing device as above characterized, which may be easily molded of sanitary plastic substance.

Another feature of the invention resides in the provision of an improved metering and dispensing device which has relatively few parts, is simple in its construction, and economical to fabricate and produce.

Other features and advantages will hereinafter appear.

In the drawings accompanying this specification, similar characters of reference are used to designate like components throughout the several views, in which.

Figure 1:
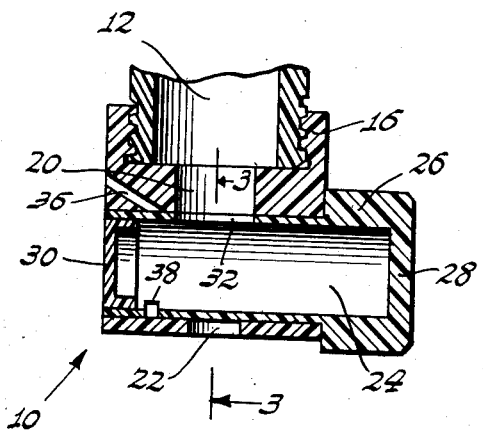
FIG. 1 is an axial sectional view of the present improved metering and dispensing attachment, shown mounted on the threaded neck of a container such as a syrup jar. The attachment is shown in non-dispensing condition, wherein it is in readiness for receiving a quantity of liquid from the container.

Referring now particularly to the figures, the present improved liquid metering and dispensing attachment is indicated generally by the numeral 10, said attachment being shown as mounted on and carried by the threaded neck portion 12 of a vessel such as a glass jar, bottle or the like. The attachment 10 comprises a valve body indicated by the numeral 14, said valve body being in shape somewhat like a threaded bottle cap, inasmuch as it is generally of cylindrical or round configuration, having an internally threaded coaxially disposed collar portion 16 adapted to be screwed onto the externally threaded neck 12 of the container.

Figure 2:
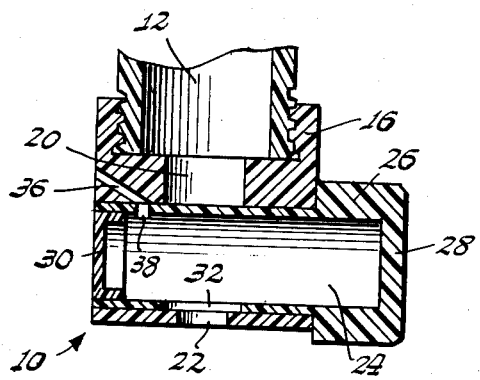
FIG. 2 is a view like that of FIG. 1, but showing the dispensing attachment in a condition wherein a measured quantity of liquid will be discharged therefrom.
Figure 3:
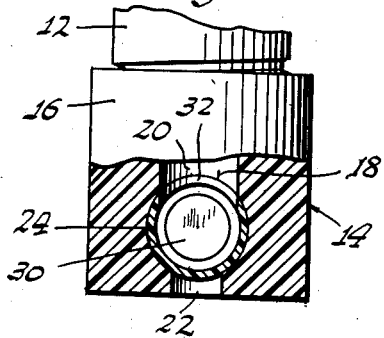
FIG. 3 is a fragmentary view partly in side elevation and partly in vertical section being taken on the line 3—3 of FIG. 1.

The valve body portion 14 has a transverse cylindrical bore 18 which preferably extends completely through the body between the opposite external cylindrical surfaces thereof. The valve body 14 also has, as seen in FIGS. 1, 2 and 3, a comparatively large, upper inlet opening 20 and a smaller, lower outlet opening 22, the said openings being coaxially arranged and aligned with each other, the larger opening 20 being adapted to communicate directly with the opening of the bottle neck 12. The diameters of the openings 20 and 22 may be of various sizes, to suit the viscosity of the liquid being dispensed. The sizes shown in the drawings are for illustrative purposes only.

In accordance with the invention, in conjunction with the valve body 14 there is provided a novel metering valve stem construction comprising a tubular and cylindrical stem 24 which snugly slidably fits within the transverse bore 18 of the valve body 14. The valve stem 24 encloses a comparatively large space constituting a metering chamber, as will be later brought out. Preferably, the valve stem 24 is molded of suitable plastic composition, and the valve body 14 may also advantageously be molded of suitable plastic substance, as will be readily understood.

The valve stem 24 has at one end an annular enlargement or head 26 and an integral end wall 28 whereby such end of the stem is completely closed. The enlargement or head 26 is preferably knurled, as seen in FIG. 4, thereby to constitute a conveniently grippable knob by which the valve stem 24 may be readily turned as it is supported in the valve body 14, as shown in FIGS. 1–3 and 6.

The other end of the valve stem 24 is provided with a closure plug 30, which may also be of plastic composition, the said plug being fixedly attached to the knurled stem in any suitable manner, as by the use of an adhesive or cement. If desired the closure plug 30 may be threaded to fit within a corresponding threaded portion of the knob 26. This would provide for adjustment of the volume of the metering chamber.

Figure 4:
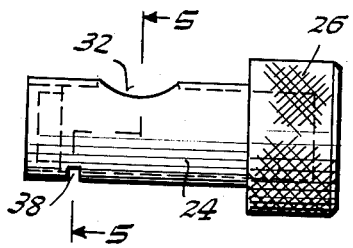
FIG. 4 is a side elevational view of the valve stem component of the dispensing and metering valve device.
Figure 5:
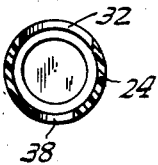
FIG. 5 is a transverse sectional view taken on the line 5—5 of FIG. 4.
Figure 6:
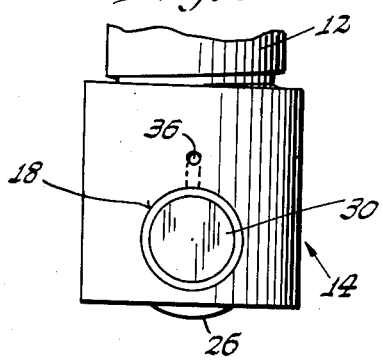
FIG. 6 is a side elevational view of the attachment, looking at the side opposite to that having the operating knob.

As seen in FIGS. 1, 2 and 4, a side wall of the valve stem 24 is provided with a filling and emptying opening 32 by which access is had to the interior space within the stem. Preferably, as shown, the filling and emptying opening 32 is of the same size and shape as the inlet opening 20 of the valve body 14, and these openings may be brought into registration with each other by suitably turning and adjusting the valve stem by means of the knob 26. Such positioning of the valve stem and registration of the openings 20, 32 are shown in FIG. 1.

It will be seen by observing FIG. 2 that upon the valve stem 24 being turned through an arc of 180 degrees from the FIG. 1 position, the filling and emptying opening 32 of the stem will become registered with the outlet opening 22 of the valve body 14.

The position of FIG. 1 is utilized for filling the metering chamber contained by the valve stem 24, since the liquid from the container neck 12 will pass downward through the inlet opening 20 and the filling opening 32, such liquid filling the entire interior of the valve stem. Upon the valve stem being turned through 180 degrees to the position of FIG. 2, the liquid within the valve stem will now have a tendency to flow out through the opening 32 and the outlet opening 22.

In accordance with the present invention, to facilitate such discharge of liquid from the valve stem 24 there is provided an automatic venting means comprising an air vent passage 36 provided in the valve body 14 and a vent opening 38 formed in the wall of the valve stem 24 at a location opposite to the filling and emptying opening 32. The vent opening 38 is preferably in the form of a slot having a diameter corresponding to the diameter of the vent passage 36 but a length substantially greater than the diameter of such passage 36. This arrangement permits the metering chamber of plug 30 to be vented before the opening 32 is fully registered with the fixed outlet opening 22. Thus, the flow of fluid from the metering chamber can be regulated from a slight trickle where a liquid like syrup is to be spread over a substantial area to a full flow as where a measured amount of cream is to be dumped into a coffee cup. As is apparent from FIGURE 1 the vent opening 38 is entirely out of communication with the vent passage 36 when the chamber opening 32 is in registration with the inlet opening 20 of the valve body. As seen in FIG. 1, when the valve stem 24 is being filled from the container, the vent opening 38 is out of registration with the air vent passage 36. However, when the valve stem is turned through 180 degrees so that it may discharge its contents, the vent opening 38 of the stem will be registered with the air vent passage 36, permitting air to enter the interior of the valve stem, whereby the liquid contents of the metering chamber may quickly run out through the emptying opening 32. Thus, the dispensing of the liquid contents of the stem is greatly speeded up, and a more accurate metering or measuring of the liquid is had by the provision of the automatically registering vent openings.

From the foregoing it will be seen that I have provided a novel and improved liquid metering and dispensing attachment which may be readily applied to existing standard threaded-neck containers such as jars, bottles and the like, to enable a rapid and accurate dispensing and measuring of the liquid contents to be had. The dispensing attachment is characterized by relatively few parts of simple construction, which may be readily economically molded of plastic substance. The dispensing attachment is easy to operate, and may be easily cleaned by merely removing the valve stem 24 whereupon the parts are accessible for cleansing. By virtue of the venting means, a free flow of the liquid is had at all times.

Variations and modifications may be made within the scope of the claim, and portions of the improvements may be used without others.

I claim:

A dispensing valve for dispensing metered amounts of liquid, comprising a valve body having circumferentially spaced inlet and outlet openings respectively, said valve body having a bore with which said openings communicate, said body having an air vent passage having an outer end open to the atmosphere and an inner end opening into said bore, a valve stem disposed in said bore and turnable therein, said stem having a metering chamber for containing a measured amount of liquid to be dispensed, said chamber having a combined filling and emptying opening shiftable successively into and out of registration with said inlet and outlet openings of said valve body upon turning of said stem in said bore, said stem being formed with a vent opening, said vent opening having a substantially larger area than said inner end of said vent passage, said vent opening becoming aligned with said inner end of said vent passage before said combined filling and emptying opening of said stem is fully registered with said outlet opening of said valve body whereby to provide means for regulating the rate of discharge of liquid from said metering chamber, and said vent opening being so located as to be entirely out of registration with said vent passage when said combined filling and emptying opening of said chamber is in registration with said inlet opening of said valve body.

References Cited in the file of this patent

UNITED STATES PATENTS

| | | |
|---|---|---|
| 154,418 | Reed et al. | Aug. 25, 1874 |
| 397,854 | Green et al. | Feb. 12, 1889 |
| 474,343 | Oakley | May 3, 1892 |
| 1,240,830 | Doering et al. | Sept. 25, 1917 |
| 1,536,854 | Holderle et al. | May 5, 1925 |
| 2,569,257 | Parker | Sept. 25, 1951 |
| 2,702,656 | Bates | Feb. 22, 1955 |